(12) United States Patent
Siuda

(10) Patent No.: US 12,042,448 B2
(45) Date of Patent: Jul. 23, 2024

(54) HEIGHT ADJUSTABLE ARMREST OF A MEDICAL CHAIR

(71) Applicant: Linet spol, s r.o., Slany (CZ)

(72) Inventor: Bronislav Siuda, Trinec (CZ)

(73) Assignee: Linet spol, s r.o., Slany (CZ)

(*) Notice: Subject to any disclaimer, the term of this patent is extended or adjusted under 35 U.S.C. 154(b) by 121 days.

(21) Appl. No.: 17/822,874

(22) Filed: Aug. 29, 2022

(65) Prior Publication Data
US 2022/0409456 A1  Dec. 29, 2022

Related U.S. Application Data

(63) Continuation-in-part of application No. 17/424,602, filed as application No. PCT/CZ2020/000003 on Jan. 20, 2020, now Pat. No. 11,872,166.

(51) Int. Cl.
| | |
|---|---|
| *A47C 7/54* | (2006.01) |
| *A61G 5/12* | (2006.01) |
| *B60N 2/75* | (2018.01) |

(52) U.S. Cl.
CPC .............. *A61G 5/125* (2016.11); *A47C 7/543* (2013.01); *B60N 2/753* (2018.02); *B60N 2/767* (2018.02)

(58) Field of Classification Search
CPC ........ A61G 15/21; A47C 7/543; B60N 2/753; B60N 2/767
See application file for complete search history.

(56) References Cited

U.S. PATENT DOCUMENTS

| | | | |
|---|---|---|---|
| 3,116,093 A | 12/1963 | Bosack | |
| 3,578,379 A | 5/1971 | Taylor et al. | |
| 4,118,069 A * | 10/1978 | Hunter | B60N 2/753 |
| | | | 297/411.32 |
| 6,715,836 B1 | 4/2004 | Chen et al. | |
| 11,492,123 B2 * | 11/2022 | Jacob | B60N 2/34 |

(Continued)

FOREIGN PATENT DOCUMENTS

EP  2888974 B1  10/2016

OTHER PUBLICATIONS

European Patent Office, International Search Report, in PCT/CZ2020/000003, filed Jan. 20, 2020, mailed Apr. 20, 2020.

(Continued)

*Primary Examiner* — Syed A Islam
(74) *Attorney, Agent, or Firm* — Thedford I. Hitaffer; Hitaffer & Hitaffer, PLLC

(57) ABSTRACT

A medical chair with height adjustable armrest comprises a lifting mechanism, a base coupled to a bottom end of the lifting mechanism, a backrest part rotatably coupled to an upper end of the lifting mechanism, and an armrest rotatably coupled to the backrest part and adjustable to at least one position. The armrest comprises a supporting part, a horizontal axle, and a latch system moving slidingly on the horizontal axle or rotatably around the horizontal axle. The latch system comprises a latch coupled to a control element and a guide tube, which is slidingly coupled to the horizontal axis by a guiding pin. The latch system further comprises a first stop of the armrest and a second stop on an upper end of an arm and a third stop on the horizontal axle, wherein the third stop is located on the horizontal axle between the upper end of the arm and a frame or the backrest part.

9 Claims, 16 Drawing Sheets

(56) References Cited

U.S. PATENT DOCUMENTS

2004/0135419 A1* 7/2004 Kitamura .............. B60N 2/753
  297/411.3
2017/0065083 A1 3/2017 Baker et al.

OTHER PUBLICATIONS

European Patent Office, Written Opinion, in PCT/CZ2020/000003, filed Jan. 20, 2020, mailed Apr. 20, 2020.

* cited by examiner

HEIGHT ADJUSTABLE ARMREST OF A MEDICAL CHAIR

CROSS-REFERENCE TO RELATED APPLICATIONS

This application is a continuation-in-part of U.S. patent application Ser. No. 17/424,602, filed on Jul. 21, 2021, which was filed under 35 USC 371, is a United States National Stage Application of International Application No. PCT/CZ2020/000003, filed Jan. 20, 2020, which claims priority to CZ Application No. PV 2019-32, filed on Jan. 21, 2019, the disclosures of which are incorporated herein by reference.

TECHNICAL FIELD OF THE INVENTION

The invention relates to medical chair area, and particularly, to a height adjustment of a medical chair armrests.

BACKGROUND OF THE INVENTION

At present time, more and more patients consider some factors previously neglected as very important. These factors include, for example, comfort, easiness or therapeutic impact of the surrounding environment and, also medical devices. Comfort of patients can be optimized by a height adjustable armrest of a medical chair. Fast and prompt adjusting of such armrest of the medical chair may minimize stress load of a patient, which is usually present during preparation for medical acts.

Japanese patent JP3613056 describes one of the options of present solutions for height adjustable armrests of medical chairs, wherein the height of the armrest is adjusted by a screw upon which an armrest stop bears.

Another known solution described in European patent EP2888974 consists of using two adjusting screws by which the armrest position is set to a required level. One of the adjusting screws is tightened and the other one is loosened when providing adjustment.

Disadvantages of the above-mentioned solutions for height adjustment of armrests are particularly insufficient simplicity and insufficient promptness to change the adjustment of the armrest. Height adjustment cannot be provided also without any accessory tool necessary to control the screw, which may potentially increase discomfort due to lack of space needed for working with such accessory tool.

The above stated reasons result in the fact that development of an easier and faster embodiment of height adjustment of armrests of medical chairs is desired and advisable.

SUMMARY OF THE INVENTION

The above-mentioned issues are solved by a medical chair with a height adjustable armrest comprised of a lifting mechanism and a base fixed to a bottom side of a lifting mechanism, a sitting part fixed to an upper side of the lifting mechanism and a backrest part fixed rotatably to the upper side of the lifting mechanism. An armrest may comprise an armrest stop, wherein the armrest is rotatably fixed to the backrest part so that the armrest can be adjusted into an upper position and into a bottom position. In the bottom position, the armrest stop bears on a first stop fixed to the backrest part and in the upper position, the armrest stop does not bear on this first stop. A latch system may be movably coupled to the backrest part and configured to receive a latch, which may include a back surface and a second stop.

The latch system can be adjusted into a first position of the latch system and into a second position of the latch system. In the first position of the latch system, the latch is between the first stop and the armrest stop, in the second position of the latch system, the latch is not between the first stop and the armrest stop. The upper position of the armrest is thus a position when the armrest stop bears on the second stop or any other position when the armrest is higher than in case when the armrest stop bears on the second stop.

The invention is particularly an easy and simple structure and that is easy and simple to handle. The height of the armrests can be adjusted without necessity to use any other accessory tool and the individual adjustments are done quickly and fast.

The latch may bear with a back side on the first stop in the first position. This may provide higher stability of the armrests.

The latch may have a shape of a wedge tapering toward the center of rotation of the armrest, which may provide easier manipulation with mechanism.

The medical chair may also comprise an arm and a coupler where the arm is fixed to the first stop and the first stop and the arm are fixed to the backrest part rotatably, whereby the coupler is fixed rotatably by a first end of the coupler to the arm and fixed rotatably by a second end of the coupler to the sitting part. The position of the first stop can change in dependence on the position of the backrest part toward the sitting part.

The latch system may comprise a handle with a handrail which may be rotatably fixed to the backrest part. The handle with the handrail may make adjustment of the latch system easier.

The latch system may include a surface comprising a projection and a handle of a locking mechanism which may comprise a hollow, whereby the projection and the hollow may fit together at least in one of the first position of the latch system or the second position of the latch system. The armrest can be locked in the required position and adjustment of the position is faster and more accurate.

In another embodiment, the latch system may include a surface comprising a hole and a handle of a locking mechanism comprising a projection, whereby the projection and the hole may fit together at least in one of the first position of the latch system or the second position of the latch system. The armrest can be locked in the required position and adjustment of the position is faster and more accurate.

In accordance another embodiment, the latch system may be fixed rotatably to the backrest part and comprise a latch, a guide tube, a control element of the guide tube including a guiding pin, and a first stop of an armrest located on a horizontal axis of the armrest. The latch system may further comprise a second stop of the armrest located on an arm by which a horizontal axis of the armrest goes through. The latch system enables the set-up of the armrest into the basic functional horizontal position and the raised functional horizontal position. The latch is in the functional horizontal position located next to the first stop of the armrest on the horizontal axis and the second stop on the arm and both stops mutually touch each other. The latch moves between the first stop of the armrest on the horizontal axis and the second stop on the arm in the raised functional horizontal position.

This latch system is a particularly simple structure that is easy to handle. The height of the armrest can be set up without the necessity of any accessory equipment and the individual positions can be set up fast using a control element of the guide tube, which is practically hidden and looks like a part of the horizontal axis of the armrest.

The latch in the basic functional horizontal position may bear on the edge of the first stop of the armrest. This layout provides higher firmness of the armrest and impossibility of accidental unlocking of the latch.

A latch may be a part of a guide tube of a control element. The latch may have, preferably, a shape of a wedge having random size, or any suitable shape that will satisfy function of a latch. This may enable easier handling of the latch system.

The medical chair with the latch system according to this embodiment may comprise an armrest having a horizontal axis that may further comprise an arm and a coupler, wherein the horizontal axis of the armrest may be coupled to a first stop of the armrest, and the horizontal axis of the armrest together with the first stop may be rotatably attached to the arm as well as to the second stop on the arm, wherein both stops and the arm may be rotatably attached to the backrest part of the medical chair. To the opposite end of the arm, the coupler may be rotatably attached, which is, at its opposite end, rotatably attached to the sitting part of the support deck frame. The position of the first stop of the armrest may change depending on position of the backrest part in relation to the sitting part.

The latch system may comprise a control element of the guide tube with a latch, which may have a shape of protruding steel edge and may be protected from safety reasons by rubber, however, the control element can be produced from different material depending on material from which the guide tube with the latch is produced. Preferably, metal material may be used, as well as any other suitable material, such as plastics, metal alloy or combination of metal alloys and plastic alloys. The control element of the guide tube with the latch may move slidingly along the horizontal axis of the armrest, wherein free and silent movement may be provided by sliders located on the circumferences of the guide tube. Also, movement and locking of the guide tube with the control element may be provided by using a guiding pin, which may go through the side opening of the guide tube and which may be fixed to the horizontal axis of the armrest to avoid falling the guide pin out of the axis, wherein simultaneously, the guiding pin functions as a restriction element that determines how far the latch can be pulled out or inserted between the stops of the latch system. The opening for the guiding pin may be as big as needed and may be directly proportional to the size of the relevant guiding pin and may be sufficiently long to enclose movement between pulling out of the latch and inserting of the latch into the gap between the individual stops to lock the given position of the armrest.

The latch system may comprise an opening and a control element of a guide tube including a latch which may form a projection. The latch may be in one position of the latch system located between stops of the latch system, and in another position the latch may draw outside the stops of the latch system. This enables locking of the armrest in the desired position while setting of such position is faster and more precise.

Preferably, the latch system of the armrest may comprise another non-functional position, wherein such position secures the armrest in the vertical position, whereby the armrest is folded up so that a patient could get up from the medical chair and leave. This non-functional vertical position may be provided using a third stop located on the horizontal axis of the armrest between the upper end of arm and the frame of the backrest part of the medical chair to which the armrest is attached. This third stop may secure or lock the armrest in the vertical position after the armchair is folded up into the vertical position when the third stop seizes on the edge of the frame of the medical chair backrest part. The armrest may thus be located in the vertical position relative to the backrest part so that a patient could leave the chair comfortably.

In the preferred embodiment, the armrest of the medical chair may be positioned into at least three positions, wherein first two positions are functional horizontal positions, which serve as a support for upper limbs of a patient, and the third position is non-functional vertical position of the armrest, which serves for easier leaving the medical chair. A latch system may be used for setting the individual positions comprising a latch, a control element, a guide tube, a first stop, a second stop, and a third stop. The entire latch system may move slidingly as well as rotatably along the horizontal axis of the armchair. Stops of the latch system may be located on the horizontal axis of the armrest and at least two stops may be in contact between each other or the latch, either directly or indirectly, according to armrest position. At least one stop may be located on the horizontal axis of the armrest between upper arm and the frame of the backrest part. This stop may secure the vertical position of the armrest so that a patient could leave the medical chair comfortably. An interlink may be located between upper arm and the third stop of the vertical position for easier handling with the armrest.

Preferably, all components of the latch system are metal, or optionally can be produced from plastic materials, or metal alloys, or metal and plastic alloys.

BRIEF DESCRIPTION OF THE DRAWINGS

The essence of the invention is further clarified by examples of embodiments which are described by using the attached drawings.

DETAILED DESCRIPTION OF THE DRAWINGS

Figure 1:
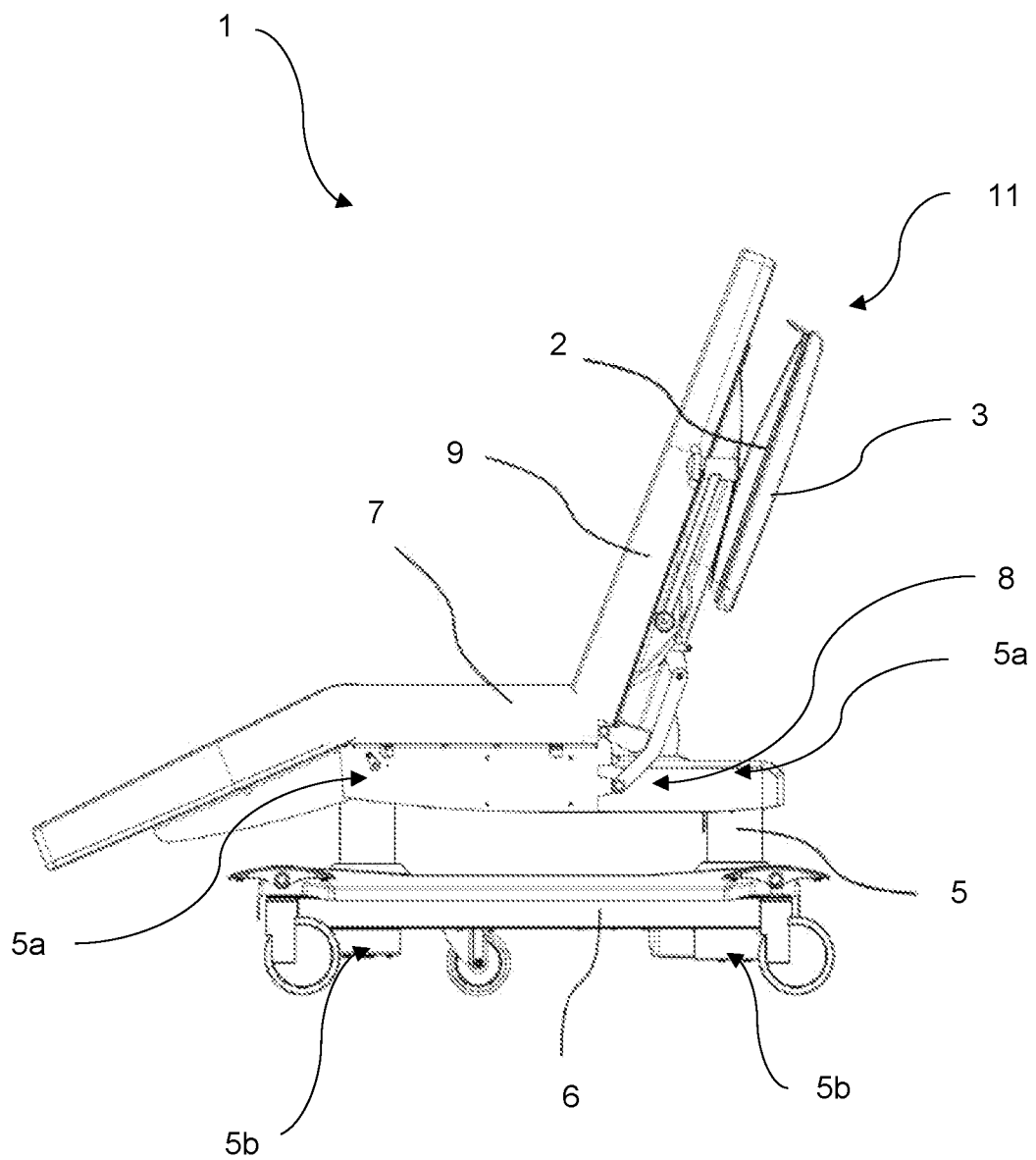
FIG. 1 is a side elevational view of a medical chair with an armrest raised.
Figure 2:
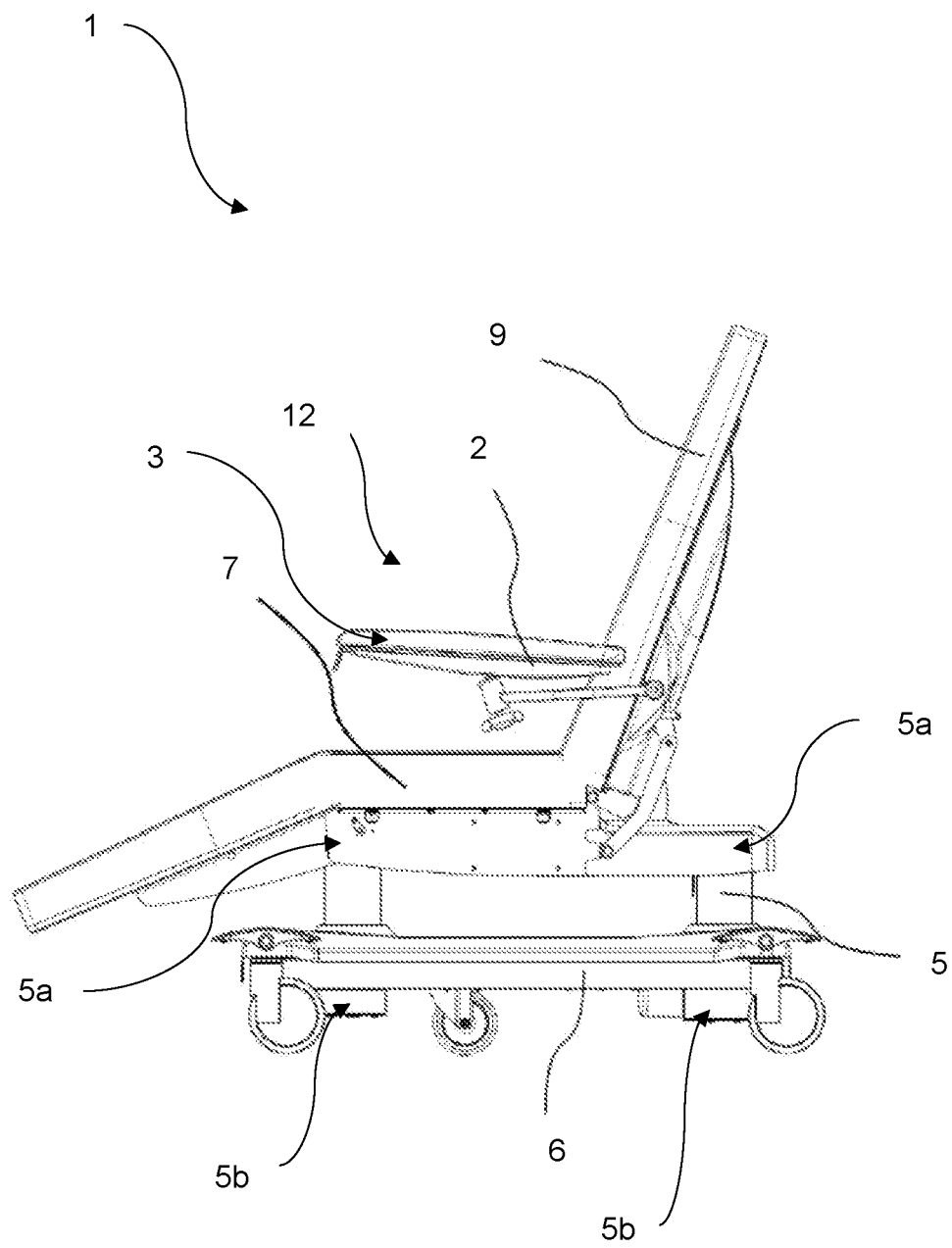
FIG. 2 is a side elevational view of the chair with the armrest tilted without a latch inserted.
Figure 3:
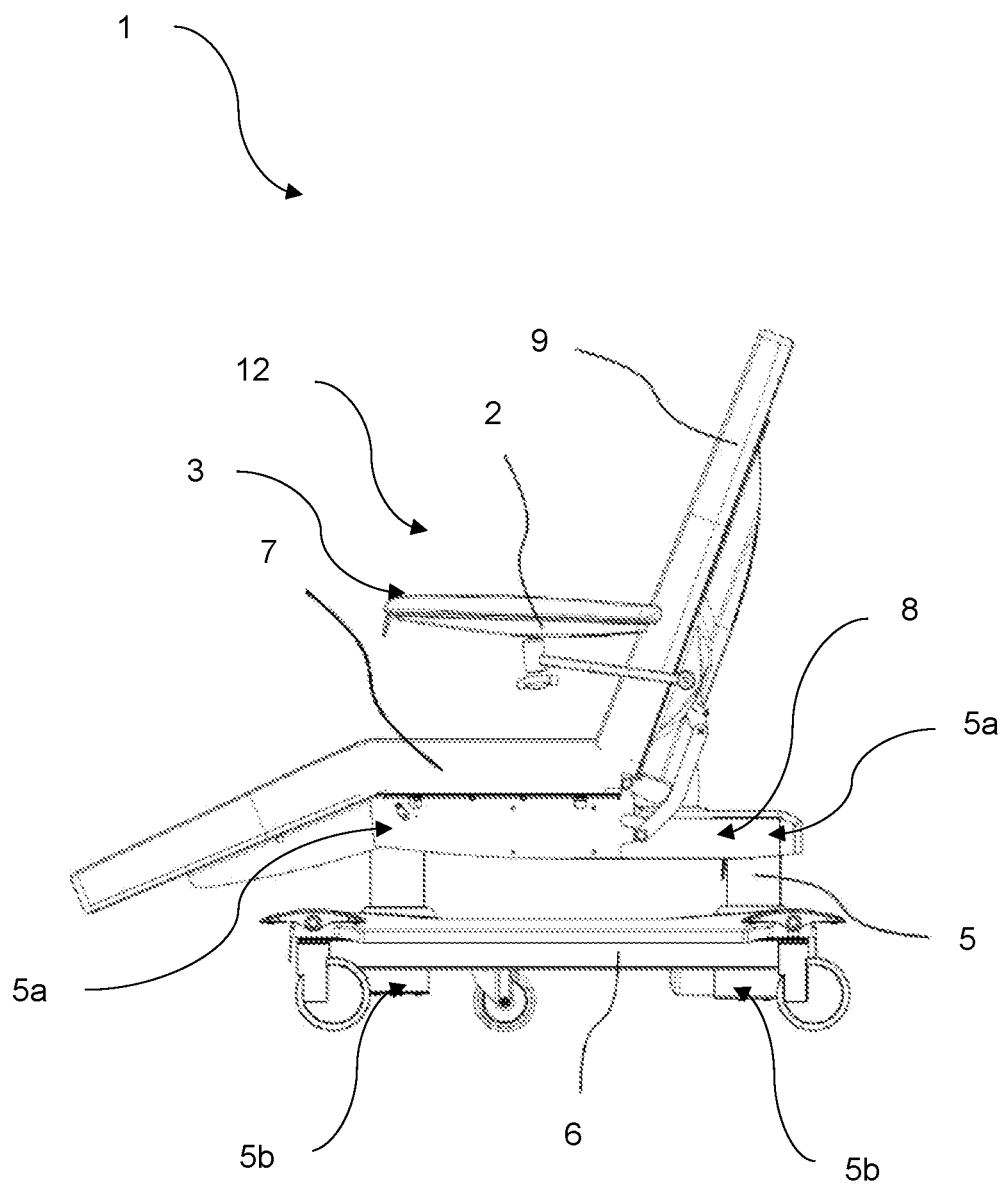
FIG. 3 is a side elevational view of the chair with the armrest tilted with the latch inserted.
Figure 4:
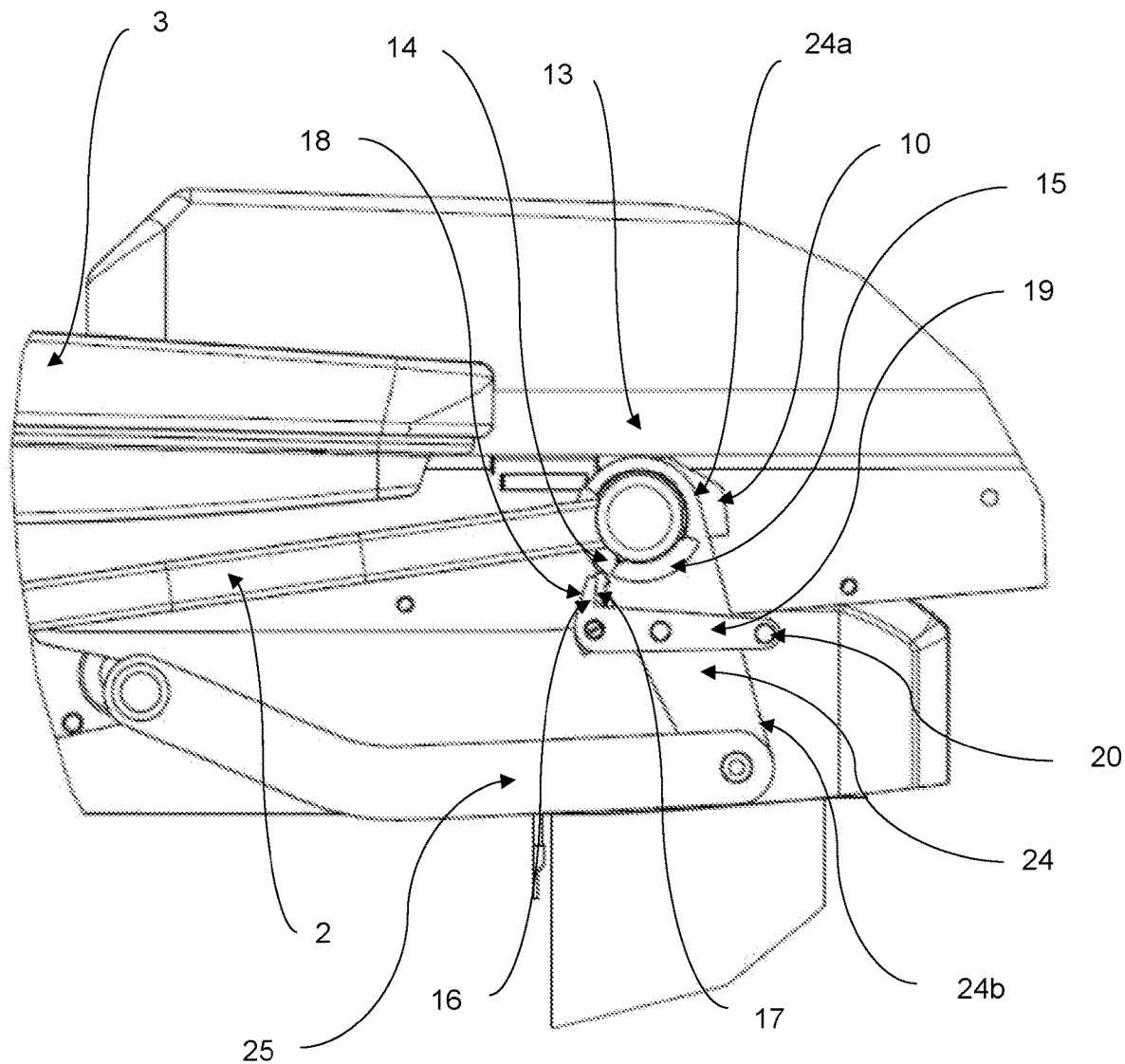
FIG. 4 is an enlarged side elevational view of the latch system in relevant part without the latch inserted.
Figure 5:
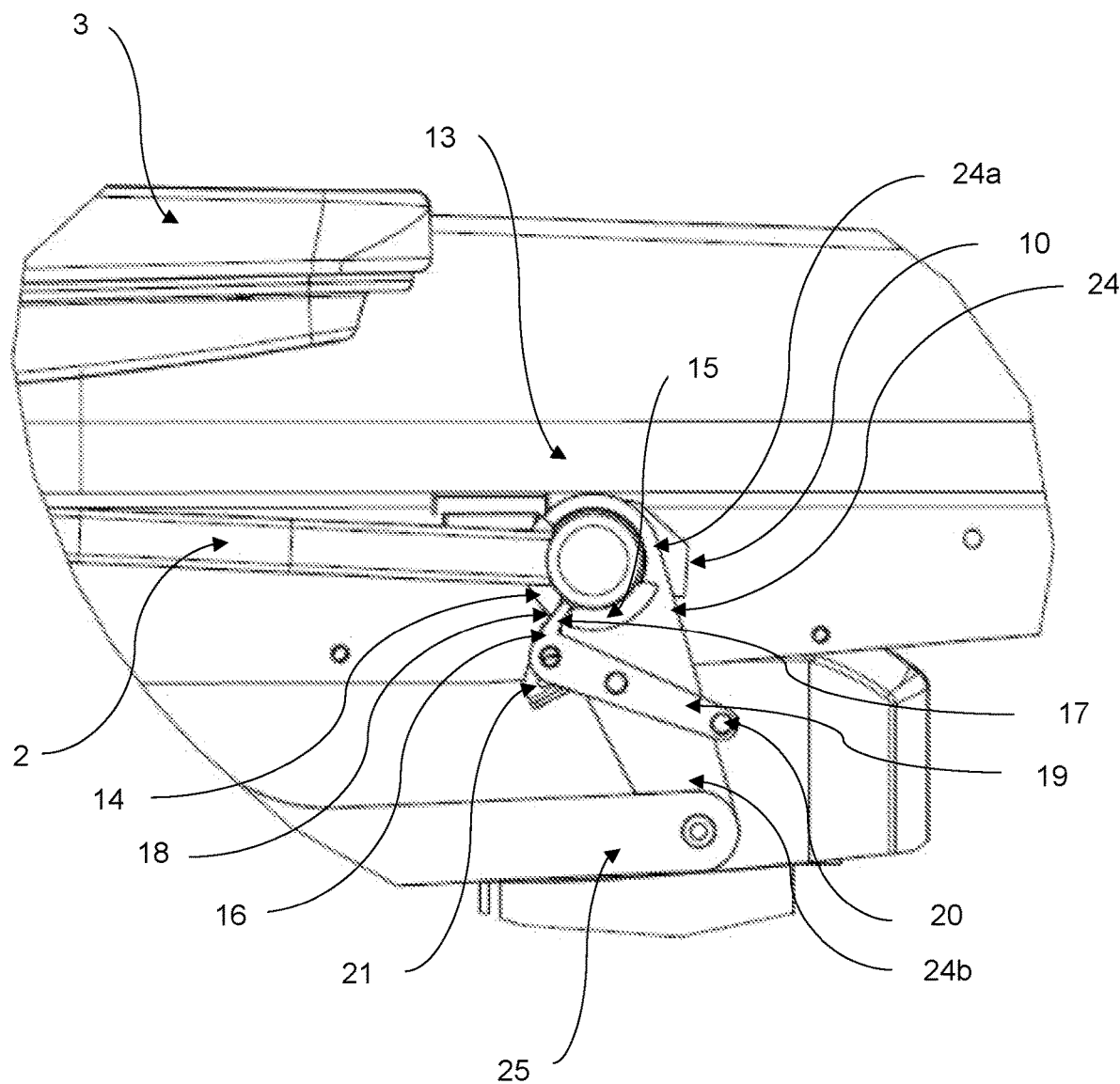
FIG. 5 is an enlarged side elevational view of the latch system shown in FIG. 4 with the latch inserted.
Figure 6:
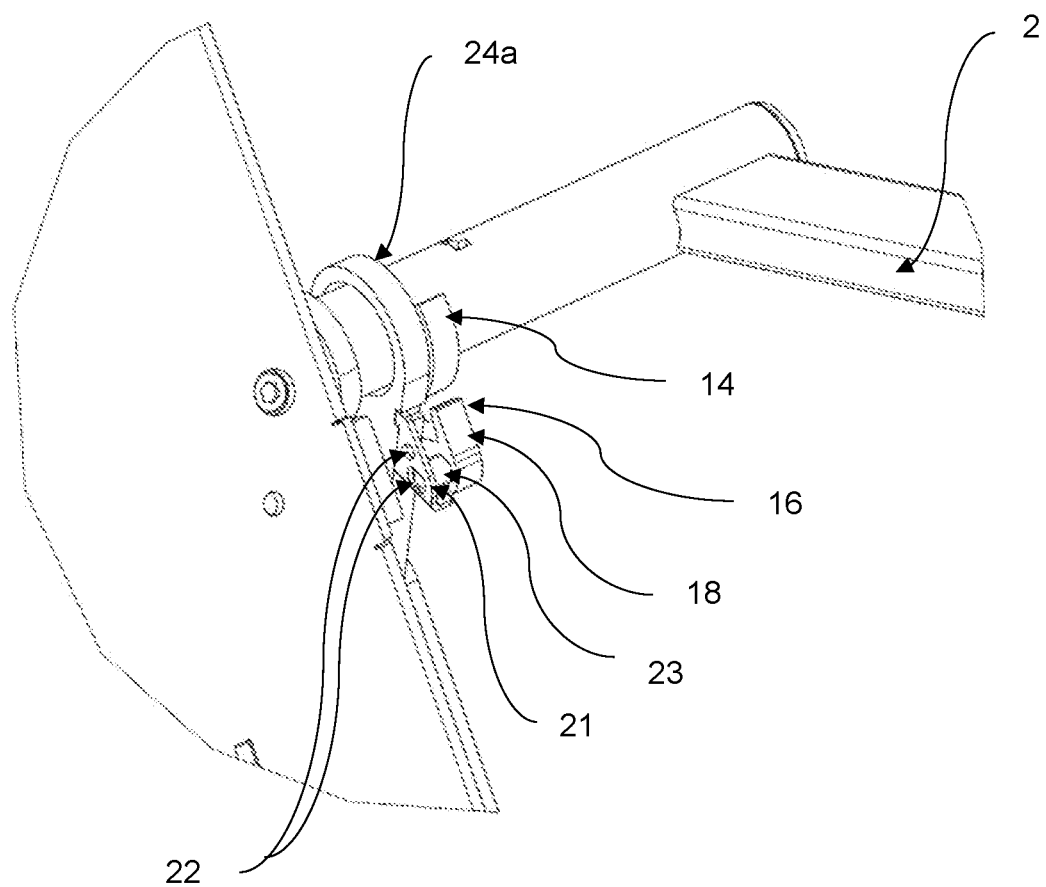
FIG. 6 is a front perspective view of the latch system shown in FIG. 4.
Figure 7:
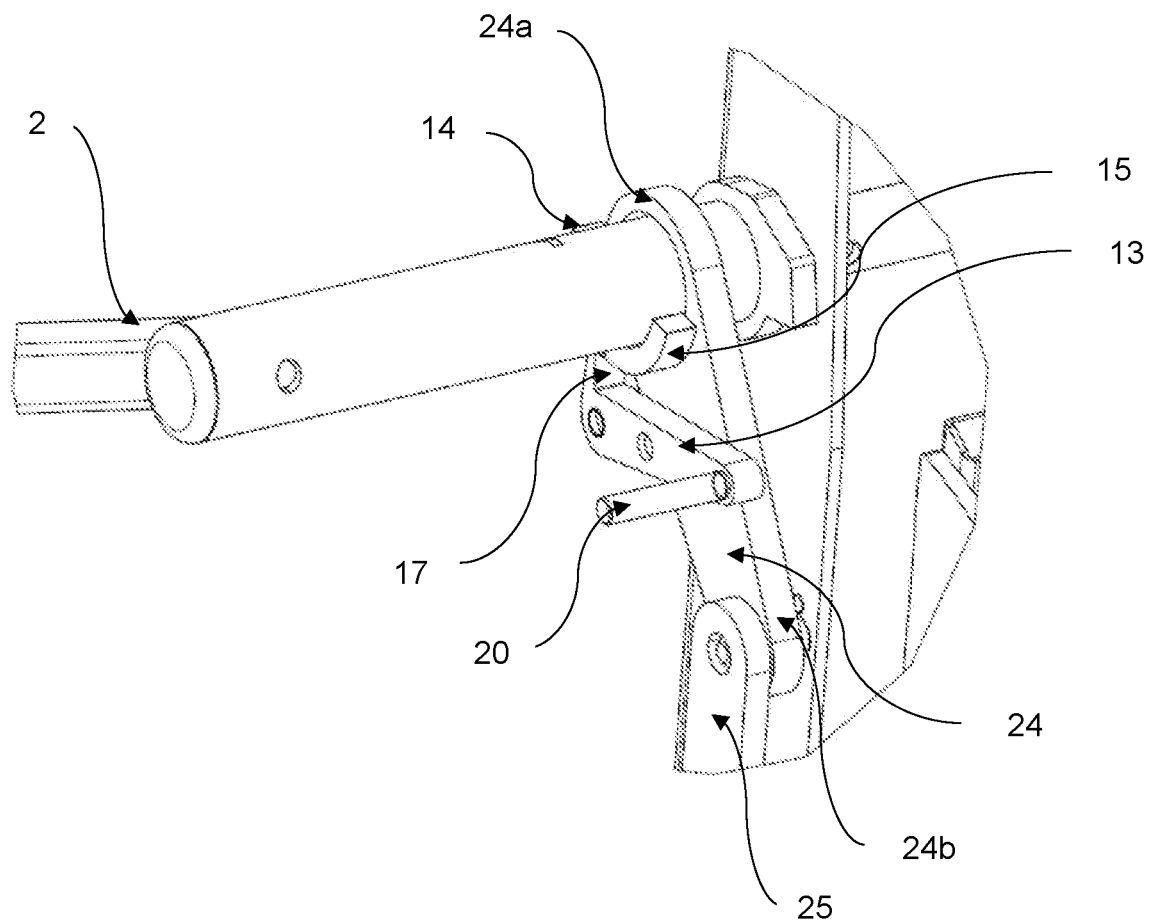
FIG. 7 is rear perspective view of the latch system shown in FIG. 4.

Medical chairs are used for many purposes, such as infusion application, one day surgery, and for different types of examination. FIG. 1 shows an exemplary embodiment of a medical chair 1 with an armrest 2 raised. The armrest 2 is a part of the chair 1 that supports upper limbs of a patient. In addition, the chair 1 comprises a backrest part 9 with adjustable tilt. The backrest part 9 is fixed in relation to a first or upper end 5a of a lifting mechanism 5 rotatably either directly, or via a frame 8 or a sitting part 7. Height adjustment of the medical chair 1 may be done by the lifting mechanism 5, a second or bottom end 5b of which may be fixed in relation to the base 6, which may comprise wheels (shown but in referenced) for easier handling may function as an undercarriage. The armrest 2 of the chair 1 may be fixed to the backrest part 9 rotatably and may be thus raised up into a functionless position 11 (shown in FIG. 1) or tilted down into a function position 12 (shown in FIGS. 2 and 3). The chair 1 comprises a latch system 13 by which the height of the armrest 2 can be adjusted in the function position 12. The latch system 13 shown in FIGS. 4-7 has a latch 16, which is put between a first stop 15 and an armrest stop 14 (as shown in FIG. 5) by which the armrest 2 position is raised as, after tilting the armrest 2 down, the armrest stop 14 touches down on a second stop 18, which is located opposite a back surface 17 of the latch 16. FIG. 2 shows the chair 1 with the armrest 2 tilted down without the latch inserted. FIG. 3 shows the chair 1 with the armrest 2 tilted down and with the latch inserted.

Figure 8:
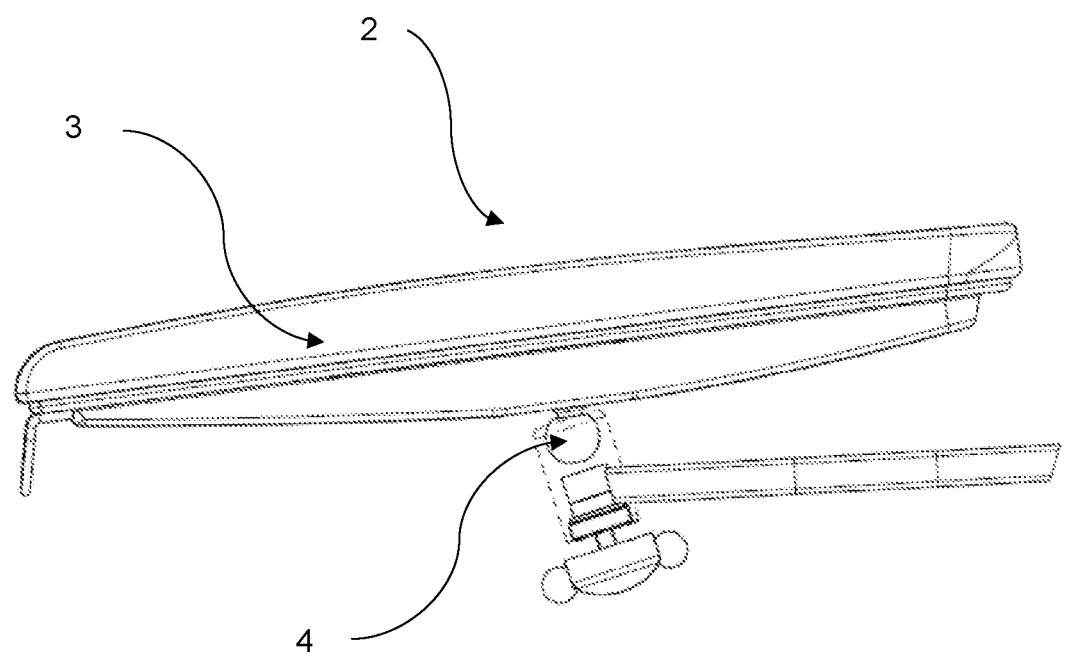
FIG. 8 is an enlarged side elevational view of armrest supported by a ball pivot.
Figure 15:
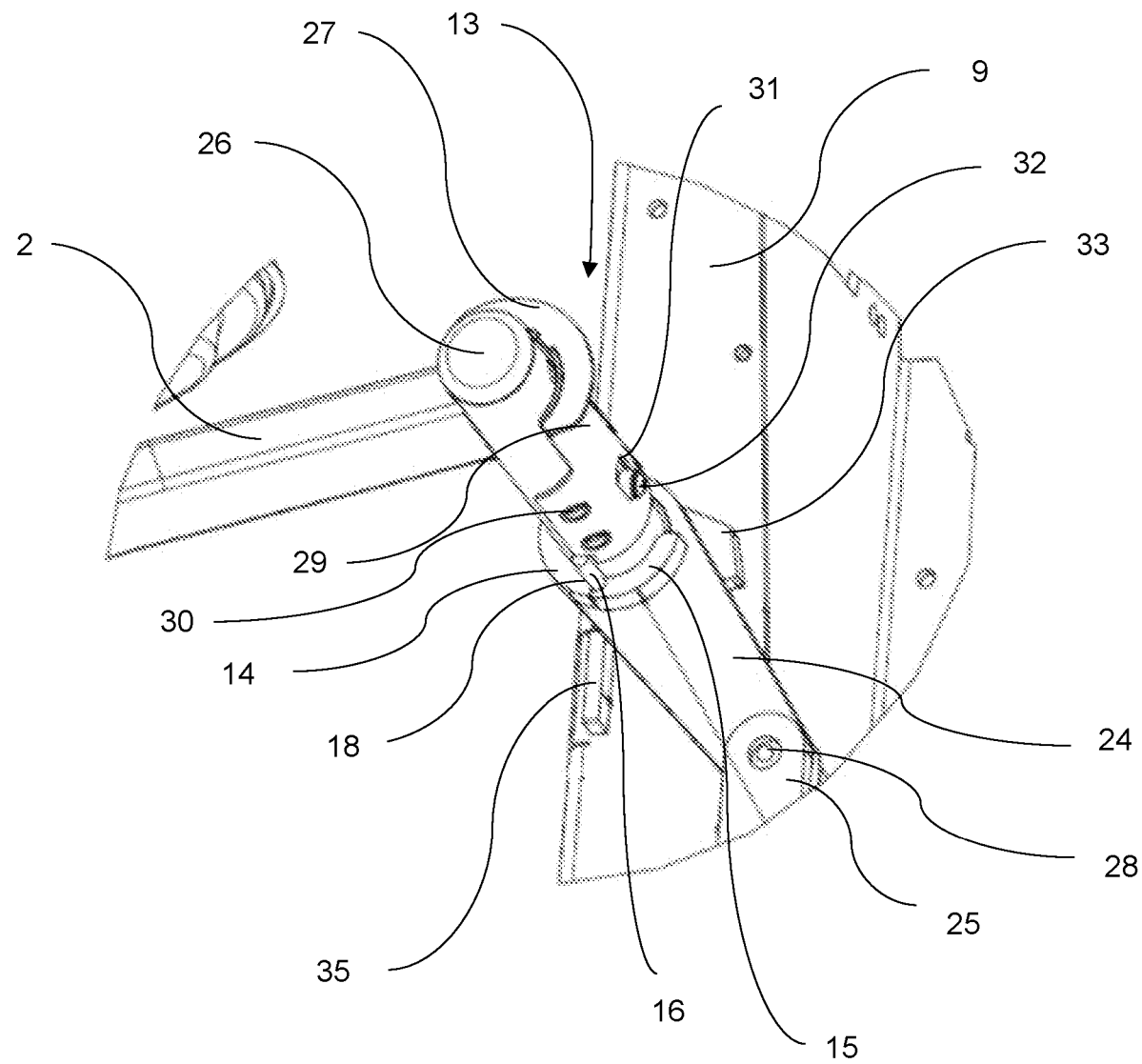
FIG. 15 a bottom rear perspective view of the latch system with a cover removed from a backrest part to show a stop for supporting the armrest in the non-functional position.
Figure 16:
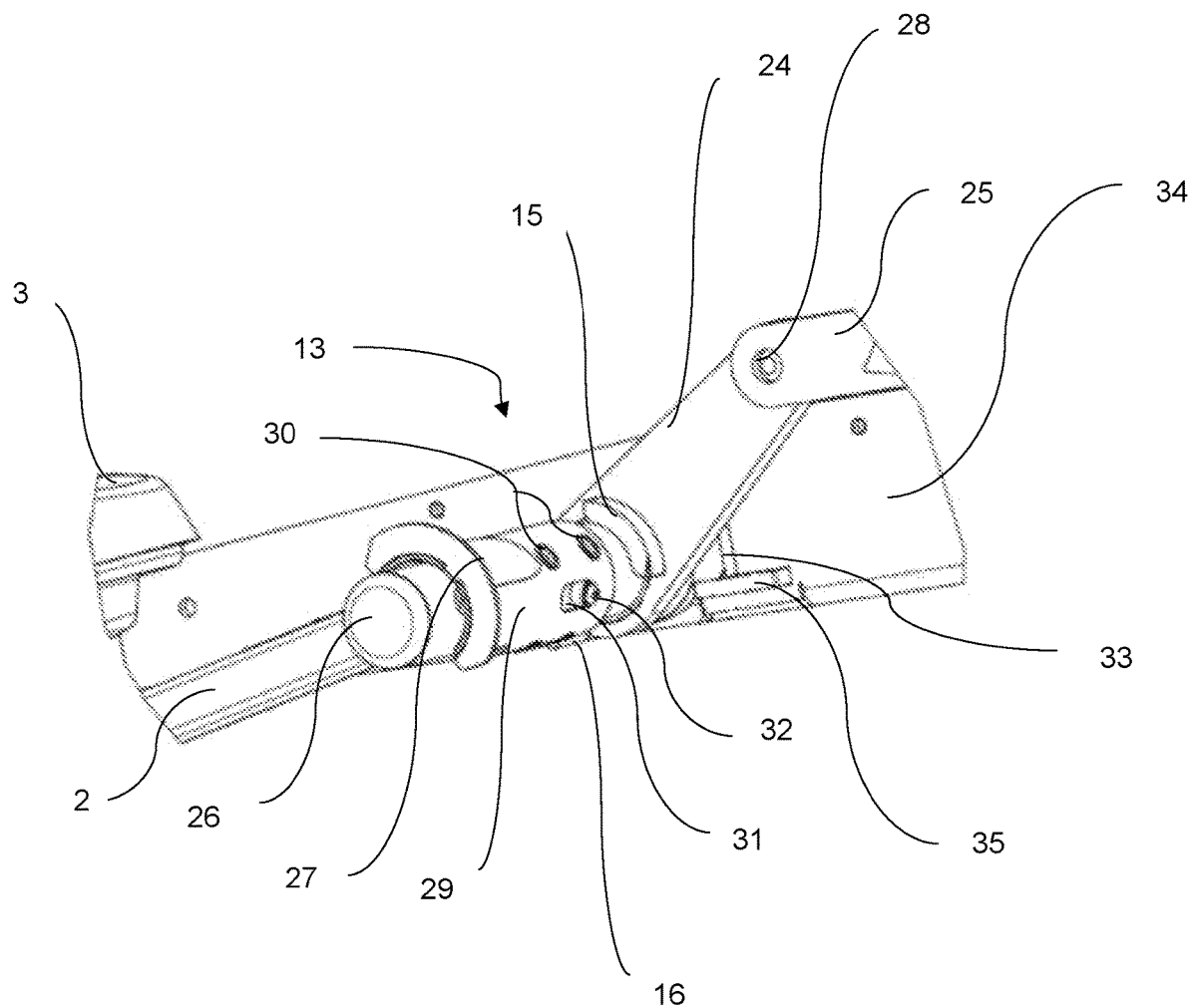
FIG. 16 a rear perspective view of the latch system shown in FIG. 15 with the armrest supported in the non-functional position.

The backrest part 9 comprises a back stop 10, which the armrest stop 14 touches down onto a restriction element (e.g., an adaptor or stop, such as the adapter or stop 35 located on a side edge of the frame of the backrest part 9, like that shown in FIG. 15) if the armrest 2 is raised or lifted off into the non-functional position according to FIG. 1. The back stop 10 works as a stop or arrest when the armrest 2 is in functionless position 11 shown in FIG. 1. This position is useful for a patient when the patient needs to move or get up from chair 1. The armrest stop 14 may be a part of the armrest 2 or may be in the form of a separate individual component, which may be coupled to the armrest 2. A supporting part 3 of the armrest 2, which is in contact with limbs of a patient, is coupled with the remaining part of the armrest 2, such as by a ball pivot 4 (shown in FIG. 8), so that the supporting part 3 of the armrest 2 may be rotatable in all axes.

In the preferred embodiment, the chair 1 comprises two armrests 2 and two latch systems 13. Each latch system 13 thus controls height of one armrest 2.

The exemplary embodiment of the latch system 13 shown in FIGS. 4-7 may be comprised of a handle 19 with a handrail 20 by which the latch 16 is rotatably inserted between the first stop 15 and the armrest stop 14. The handrail 20 may be in the form of a metal cylinder or rod oriented out of the figure but it can be in the form of a wooden handrail or otherwise. The handle 19 is rotatably coupled to backrest part 9.

It should be appreciated that the latch 16 may be inserted between the first stop 15 and the armrest stop 14 translationally.

The exemplary latch system 13 may further comprise a surface 21, which comprises two holes or hollows 22, and a handle 19 of the latching system 13 may comprise a projection 23. The projection 23 may be configured to fit into these two hollows 22. For example, the projection 23 may be in the form of a conical bolt or pin with a spring (not shown) or that is spring loaded, and which may be fixed to a side of the handle 19 and may fit into one of the hollows 22 in the surface 21 depending on the position of the handle 19. The projection 23 may be made of a flexible material, including, for example, a rubber element or a plastic alloy. The projection 23 and the hollows 22 perform a locking function when the projection 23 and the hollows 22 make mechanical contact upon inserting the latch 16 between the first stop 15 and the armrest stop 14 or otherwise upon protrusion of the stop 14. The hollows 22 and the projection 23 are designed with an overlap and the handle 19 or surface 21 is flexible, to urge the hollows 22 and the projection 23 into mechanical contact. In case of mechanical contact of the hollows 22 and the projection 23, the projection 23 enters into a space defined by the hollows 22 and the position of the latch system 13 is locked. Should the latch system 13 be locked, it will be necessary to overcome a certain force (e.g., exerted by the flexible nature of the hollows 22 and/or projection 23) to change the position. The latch system 13 comprises two locking positions and the latch 16 is locked in the first position when the latch 16 is inserted between the first stop 15 and the armrest stop 14 and in the second position when the latch 16 is not inserted between the first stop 15 and the armrest stop 14.

Figure 9:
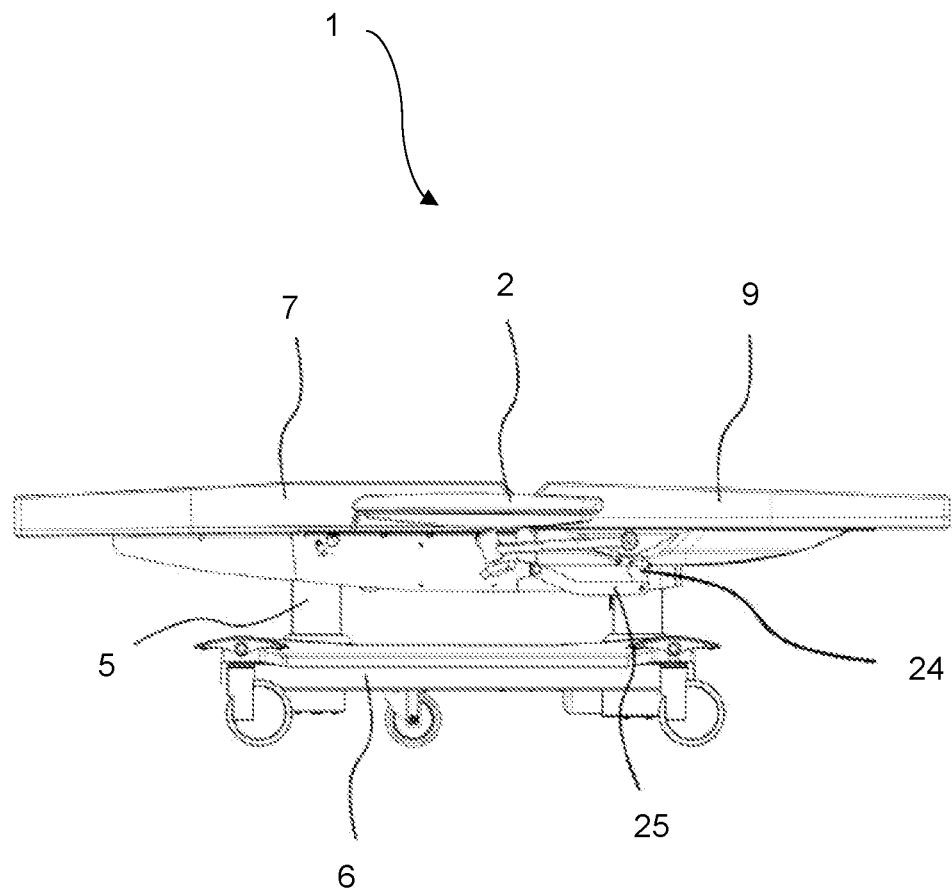
FIG. 9 is a side elevational view of the medical chair with a movement coupling the backrest part and armrest.

The chair 1 may further comprise an arm 24, which is coupled rotatably to the armrest 2 and the first stop 15 on a first or upper end 24a of the arm 24 and via a coupler 25 to the backrest part 9 on a second or lower end 24b of the arm 24. The coupler 25 (a lower end thereof) couples the arm 24 with the sitting part 7 or the frame 8 or other structure of the chair 1, which is coupled with the sitting part 7 (shown but not referenced in FIGS. 1-3). This may provide coupling of movement of the backrest part 9 and the armrests 2. That is to say, upon tilting of the backrest part 9 backward (as shown in FIG. 9), the stops and the latch mechanisms rotate due to the coupling by which the armrests 2 can be tilted down. Conversely, upon tilting of the backrest part 9 upward the armrests 2 raise up.

It should be understood that the armrest stop 14, the first stop 15 and the second stop 18 are all in the same plane (i.e., a vertical plane). The armrest stop 14 engages either the first stop 15 to support the armrest 2 in a first position (shown in FIG. 4), or when the armrest 2 is slightly raised or rotated to a second position (shown in FIG. 5), the armrest stop 14 disengages the first stop 15 to form a gap (shown in FIG. 5) between the armrest stop 14 and the first stop 15. In this second position, the second stop 18 is insertable between the armrest stop 14 and the first stop 15 (shown in FIG. 5) to prevent the armrest 2 from dropping below this second position.

Despite the fact that the aforementioned latch system 13 is very effective for positioning and adjusting an armrest, a caregiver or a patient may graze and cause spontaneous change of armrest position, or an armrest 2 may fall over, which is undesired with respect to safety of a patient leaning on the armrest.

Figure 10:
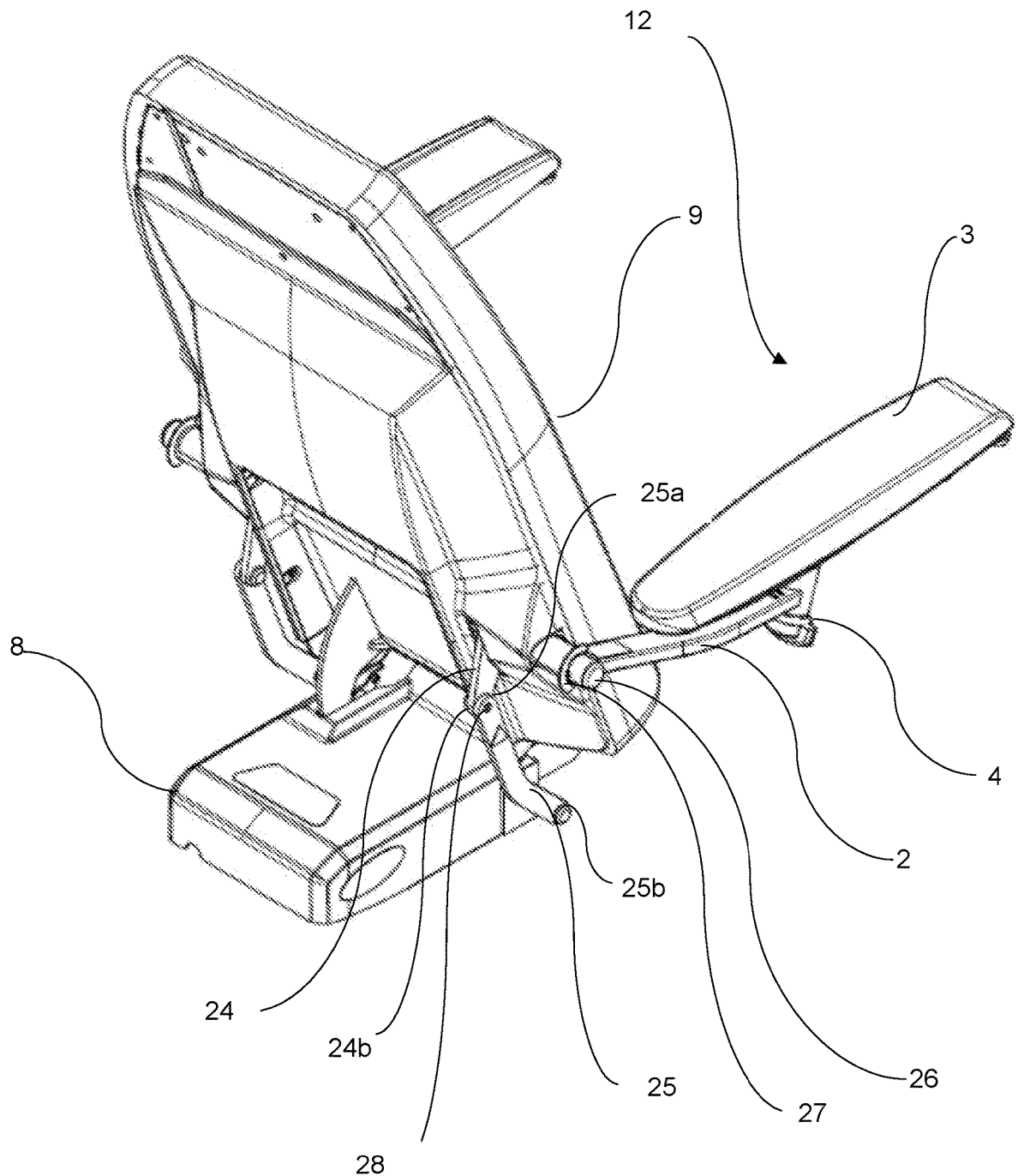
FIG. 10 is a rear perspective view of a medical chair according to another exemplary embodiment.

This undesirable effect may be addressed by an alternative embodiment of a medical chair 1, shown in FIG. 10, wherein the armrest 2 is attached to the backrest part 9 by means of a horizontal axle 26 on which a control element 27 of a latch system 13 of the armrest 2 is located. The latch system 13 may be hidden under a cover (shown but not referenced in FIG. 10) of the backrest part 9. The latch system 13 may comprise an arm 24 and a coupler 25, wherein the arm 24 may be coupled at a first or upper end (not shown) of the arm 24 with the horizontal axle 10 of the armrest 2, and at a second or bottom end 24b of the arm 24 with a first or upper end 25a of the coupler 25 using a coupling pin 28. The coupler 25 may be coupled at a second or bottom end 25b of the coupler 25 with a positioning mechanism (shown but not referenced) of the backrest part 9.

Figure 11:
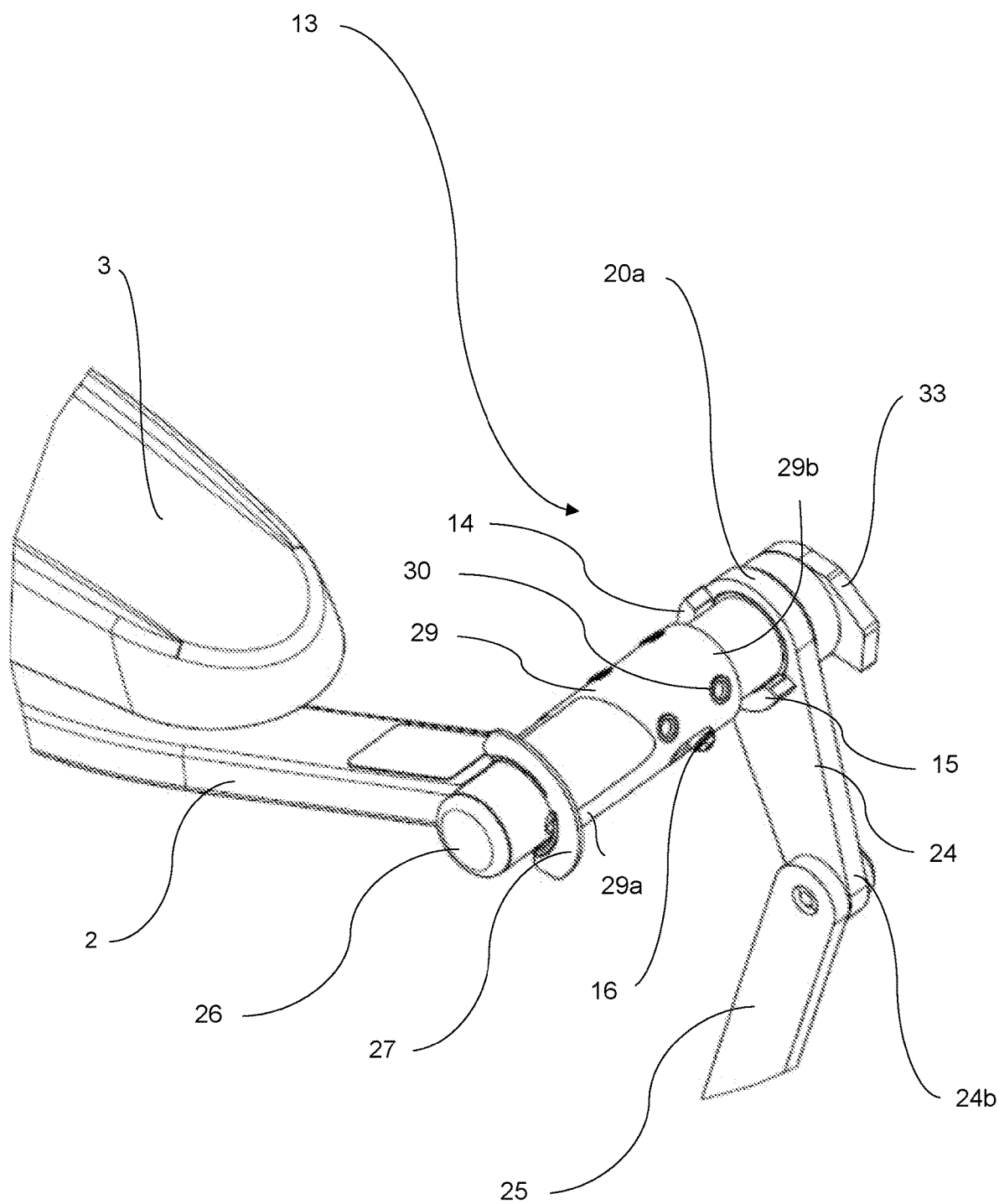
FIG. 11 is an enlarged top perspective view of an alternative latch system.

As shown in FIGS. 11-14, the latch system 13 may comprise a guide tube 29 with the control element 27 supported in relation to a first end 29a of the guide tube 29 and a latch 16 at second end 29b of the guide tube 29 and being in contact with an armrest stop 14 of the armrest 2, which moves with the horizontal axle 26 of the armrest 2 (in a clockwise direction when viewing the drawings). As mentioned above, the latch system 13 comprises the control element 27, which is part of the guide tube 29, which moves slidingly along the horizontal axle 26 of the armrest 2. The guide tube 29 comprises at least one bearing (e.g., a linear bearing) or slider 30 at a perimeter of the guide tube 29 for easy movement along the horizontal axle 26 of the armrest 2. More sliders 30 can be located on the guide tube 29, although four sliders 30 are shown in the drawings. The guide tube 29 may further comprise at an oval opening 31 on at least one side that a guiding pin 32 passes through. This guiding pin 32 restricts movement of the guide tube 29 rotatably around the horizontal axle 26 of the armrest 2. Preferably, the oval opening 31 for the guiding pin 32 is sufficiently long to enable movement yet restrict movement of the guide tube 29 along the horizontal axle 26 (i.e., in a longitudinal or axial direction) and to control the position of a latch 16. FIG. 11 shows a part of the armrest stop 14 of the armrest 2 and a part of a second stop 18 on the guide tube 29, which are located under the horizontal axle 26 of the armrest 2 close to the upper end 24a of the arm 24. The arm 24 is coupled for rotation at its upper end 24a with the horizontal axle 26 of the armrest 2, and at its bottom end 24b with an upper end 25a of the coupler 25 by means of the coupling pin 28. The coupler 25 is coupled at a bottom end 25a of the coupler 25 with a positioning mechanism (not shown) of the backrest part 9, which may be attached to the frame 8 or the sitting part 7. A third stop 33 of the armrest 2 is located behind the upper end 24a of the arm 24a (when viewing the drawings) on a blind or distal end of the horizontal axle 26 at a point, where on an opposite end, the horizontal axle 26 of the armrest 2 is attached. The third stop 33 enables tilting the armrest 2 over into the non-functional vertical position 11 (shown in FIG. 1). The third stop 33 is located on the horizontal axle 26 between the upper end 24a of the arm 24 and the frame 34 (shown in FIG. 15) or of the backrest part 9, where the armrest 2 is attached to the backrest part 9. The third stop 33 secures or supports the armrest 2 in the non-functional vertical position 11.

Figure 12:
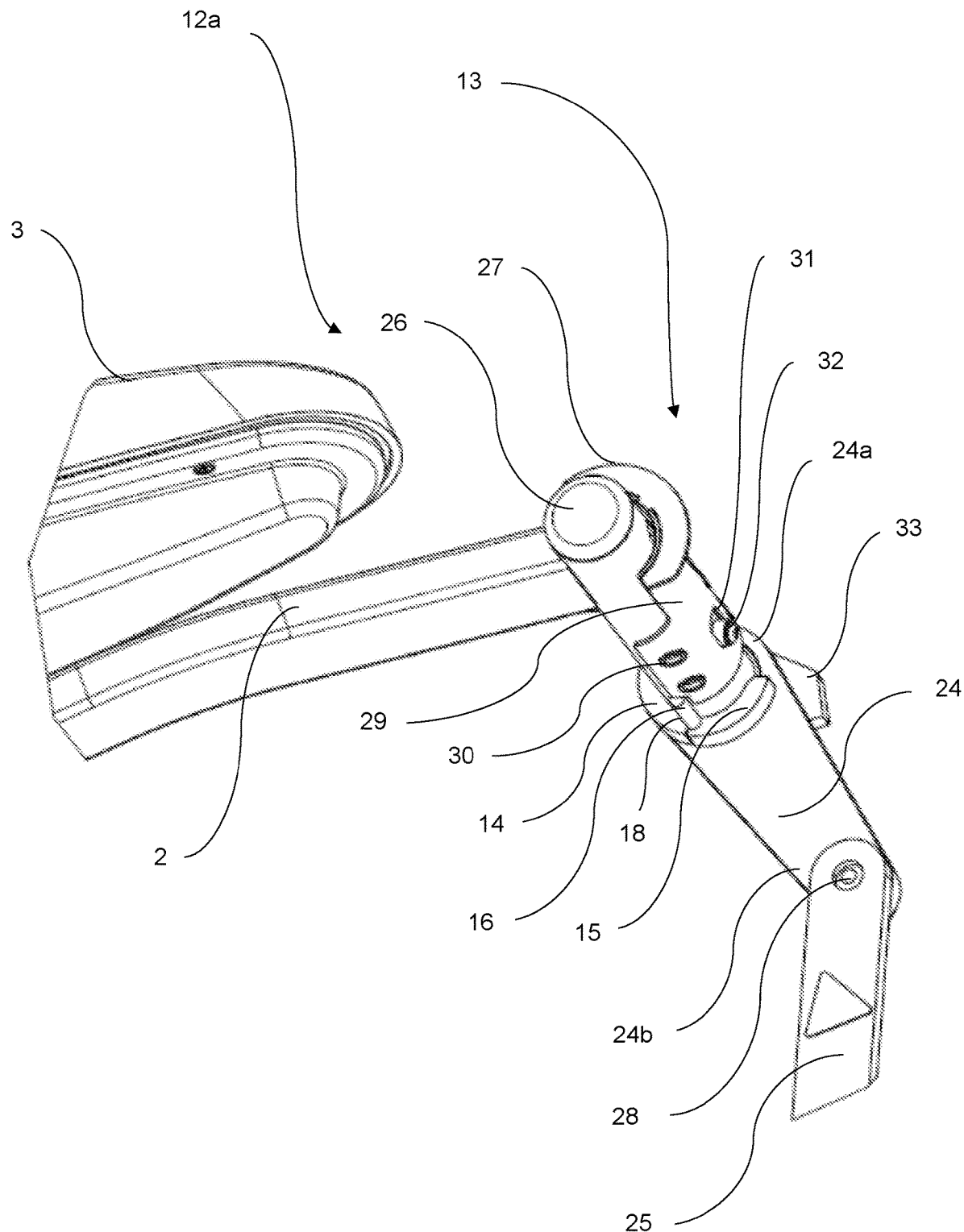
FIG. 12 is a bottom perspective view of the latch system shown in FIG. 11.

In FIG. 12, the latch system 13 is shown in detail with the support 3 of the armrest 2 and the horizontal axle 26 of the armrest 2, which is rotatably attachable to the backrest part 9 of the medical chair 1 (e.g., shown in FIG. 1) at an opposite end of the armrest 2. The armrest 2 is rotatably attached to the arm 24 at the upper end 24a of the arm 24, and at the opposite or bottom end 24b of the arm 24, the armrest 2 is rotatably attached to the coupler 25 by means of the coupling pin 28. The lower end 25b of the coupler 25 is attached to the frame 8 of a medical chair 1. FIG. 12 shows the latch system 13, which comprises the control element 27, the guide tube 29, and the latch 16, which touches a side edge of the second stop 18 on the guide tube 29, which is in contact with the armrest stop 14 of the armrest 2 and the first stop 15 of the arm 24. In this position, the armrest 2 is in the basic functional horizontal position 12a. Both stops 14 and 15 are in contact with each other. The third stop 33 is located on an opposite side of the upper end 24a of the arm 24. The third stop 33 serves for tilting the armrest 2 into a non-functional vertical position 11 (shown in FIG. 1). In the preferred embodiment, a restriction element in the form of an adaptor or stop 35 (shown in FIG. 15) may be located on a side edge of the frame 34 of the backrest part 9 to which the third stop 33 bears on and due to which the armrest 2 can be secured or supported in the non-functional vertical position 11. The third stop 33 is located on the horizontal axle 26 of the armrest 2 at the point where the horizontal axis 26 of the armrest 2 is coupled with the frame 34 of the backrest part 9, where the stop 35 (shown in FIG. 15) formed by an edge of the backrest part 9 restricts the position of the third stop 33 of the latch system 13 by which a non-functional vertical position 11 of the armrest 2 is fixed and secured.

Figure 13:
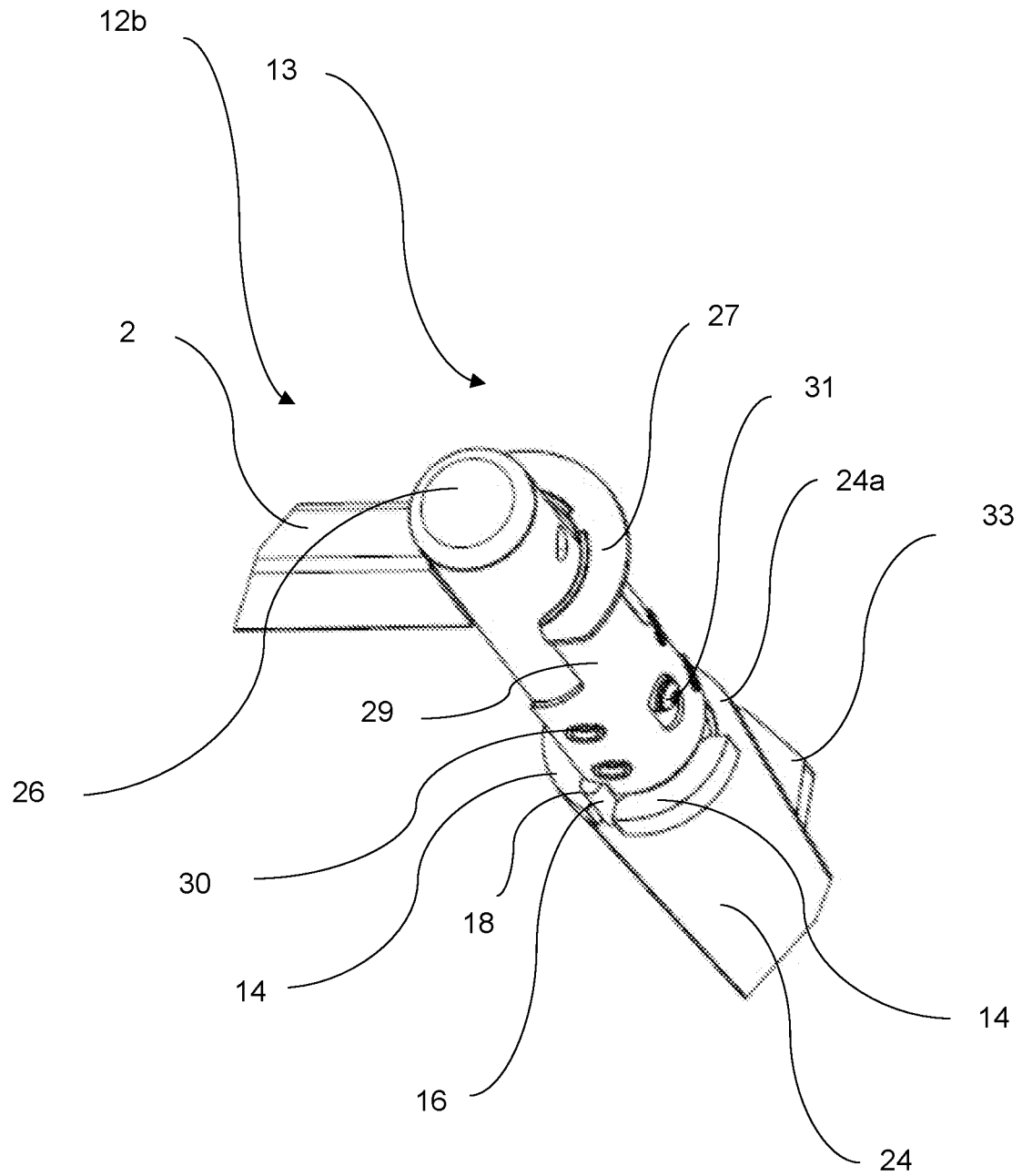
FIG. 13 is a slightly enlarged bottom perspective view of the latch system in a first functional horizontal position.

FIG. 13 shows the latch system 13 in a raised functional horizontal position 12b wherein the latch system 13 comprises the latch 16 located between the armrest stop 14 of the armrest 2 and the first stop 15 on the arm 24. FIG. 13 shows a part of the armrest 2 and the horizontal axle 26 of the armrest 2, which is rotatably coupled with the frame 34 of the backrest part 9. The latch system 13 is located on the horizontal axle 26 of the armrest 2 and comprises the control element 27, which is a part of the guide tube 29, the latch 16, which moves slidingly along the horizontal axle 26 of the armrest 2 toward or backward from the frame 34 of the backrest part 9 using the guiding pin 32, by which the guide tube 29 is fixed via the oval opening 31 of the guide tube 29 to the horizontal axle 26 of the armrest 2, due to which a position of the latch 16 can be controlled in the individual functional horizontal positions 12 of the armrest 2.

Figure 14:
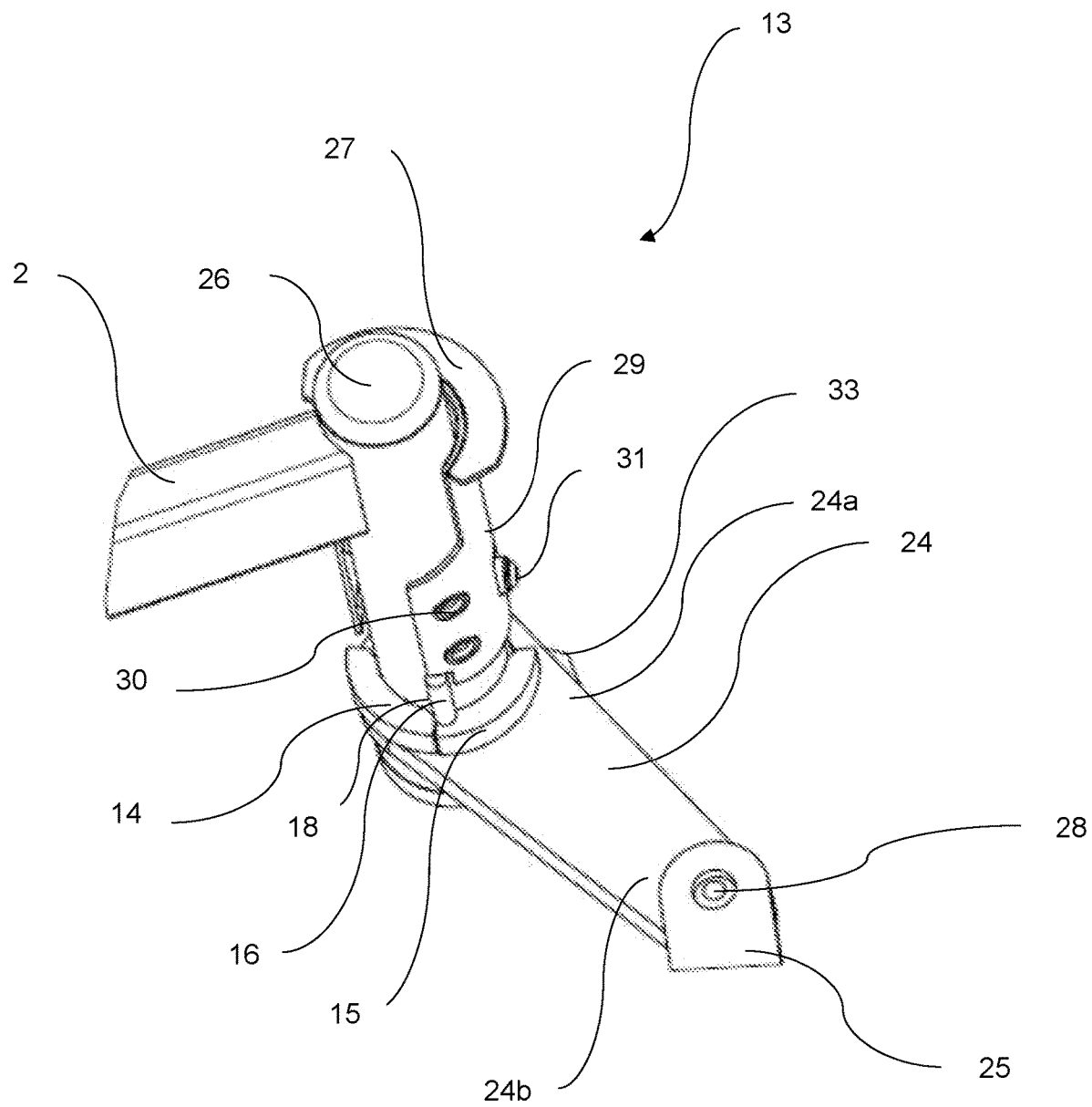
FIG. 14 a bottom perspective view of the latch system shown in FIG. 13 in the second functional horizontal position.

In FIG. 14, the latch system 13 of the armrest 2 is shown with the armrest 2 in a basic functional horizontal position 12a, where the latch 16 is not located between the armrest stop 14 of the armrest 2 and the first stop 15 on the arm 24. In this case, both stops 14 and 15 of the latch system 13 are in contact with their edges. The armrest stop 14 of the armrest 2 is located on the horizontal axle 26 of the armrest 2 and the first stop 14 on the arm 24 is a part of upper end 24a of the arm 24 and both stops 14 and 15 follow the same rotatable movement around the horizontal axle 26 of the armrest 2, which is fixed to the frame 34 or the backrest part 9. The control element 27, together with the guide tube 29 of a latch 16, moves along the horizontal axle 26 of the armrest 2. The control element 27 enables a patient or caregiver to move the latch 16 side to side. This movement is restricted by means of the oval opening 31, which the guiding pin 32 goes through and by which the guide tube 29 is fixed, and also enables movement along the horizontal axle 26. This movement is as far as the latch 16 could be pushed in between the armrest stop 14 of the armrest 2 and the first stop 15 on the arm 24 or otherwise, the latch 16 could pull out and enable mutual contact of the armrest stop 14 of the armrest 2 and the first stop 15 on the arm 24, by which the basic functional horizontal position 12a changes to the raised functional horizontal position 12b.

The above-described height adjustment of an armrest may be utilized particularly in medical supports, such as chairs and beds, but also in means of transportation or relaxation chairs, lounges or deckchairs.

LIST OF REFERENCE SIGNS

1 Medical chair
2 Armrest
3 Supporting part (of armrest, in contact with patient limbs)
4 Ball pivot
5 Lifting mechanism
5a First or upper end (of lifting mechanism)
5b Second or bottom end (of lifting mechanism)
6 Base (undercarriage)
7 Sitting part
8 Frame
9 Backrest part
10 Back stop
11 Functionless position (where armrest is raised up)
12 Function position (where armrest is tilted down)
13 Latch system
14 Armrest stop
15 First stop
16 Latch
17 Back surface
18 Second stop
19 Handle
20 Handrail
21 Surface (of latch system)
22 Hollows or holes
23 Projection
24 Arm
24a First or upper end (of arm)
24b Second or lower end (of arm)
25 Coupler
25a First or upper end (of coupler)
25b Second or bottom end (of coupler)
26 Horizontal axle
27 Control element
28 Coupling pin
29 Guide tube
30 Slider
31 Oval opening
32 Guiding pin
33 Third stop
34 Frame (of backrest part)
35 Adaptor or stop

The invention claimed is:

1. A medical chair with height adjustable armrest comprising:
a lifting mechanism,
a base coupled to a bottom end of the lifting mechanism,
a backrest part rotatably coupled to an upper end of the lifting mechanism, and
an armrest rotatably coupled to the backrest part and adjustable to at least one position, wherein the armrest comprises:
a supporting part,
a horizontal axle,
a latch system moving slidingly on the horizontal axle of the armrest or rotatably around the horizontal axle of the armrest, wherein the latch system comprises a latch coupled to a control element and a guide tube, which is slidingly coupled to the horizontal axle by a guiding pin, and wherein the latch system comprises a first stop of the armrest and a second stop on an upper end of an arm and a third stop on the horizontal axle, wherein the third stop is located on the horizontal axle between the upper end of the arm and a frame or the backrest part.

2. The medical chair with height adjustable armrest according to claim 1, wherein the latch, being in a basic functional horizontal position of the armrest, bears sideward mutually touching the first stop of the armrest and the second stop on the arm.

3. The medical chair with height adjustable armrest according to claim 1, wherein the latch, being in a raised functional horizontal position of the armrest, is located between the first stop of the armrest and the second stop on the arm.

4. The medical chair with height adjustable armrest according to claim 1, wherein the latch is a part of the guide tube as well as the control element.

5. The medical chair with height adjustable armrest according to claim 1, wherein the control element, the guide tube and the latch move slidingly along the horizontal axle of the armrest.

6. The medical chair with height adjustable armrest according to claim 1, wherein a non-functional vertical position comprises the third stop of the armrest located on the horizontal axle of the armrest between the frame and the backrest part, whose further movement is restricted by a projection on the frame or the backrest part.

7. The medical chair with height adjustable armrest according to claim 1, wherein at least one position of the armrest is secured by at least one or two stops of the latch system.

8. The medical chair with height adjustable armrest according to claim 1, wherein the latch system comprises the control element, the guide tube and the latch, wherein the guide tube is coupled to the horizontal axle of the armrest slidingly by the guiding pin.

9. The medical chair with height adjustable armrest according to claim 1, wherein the latch system comprises the guide tube, which further comprises an oval opening for the guiding pin and sliders.

* * * * *